Dec. 21, 1965  E. L. CHADWICK  3,224,476
SAW CHAIN
Filed Sept. 5, 1963  3 Sheets-Sheet 1
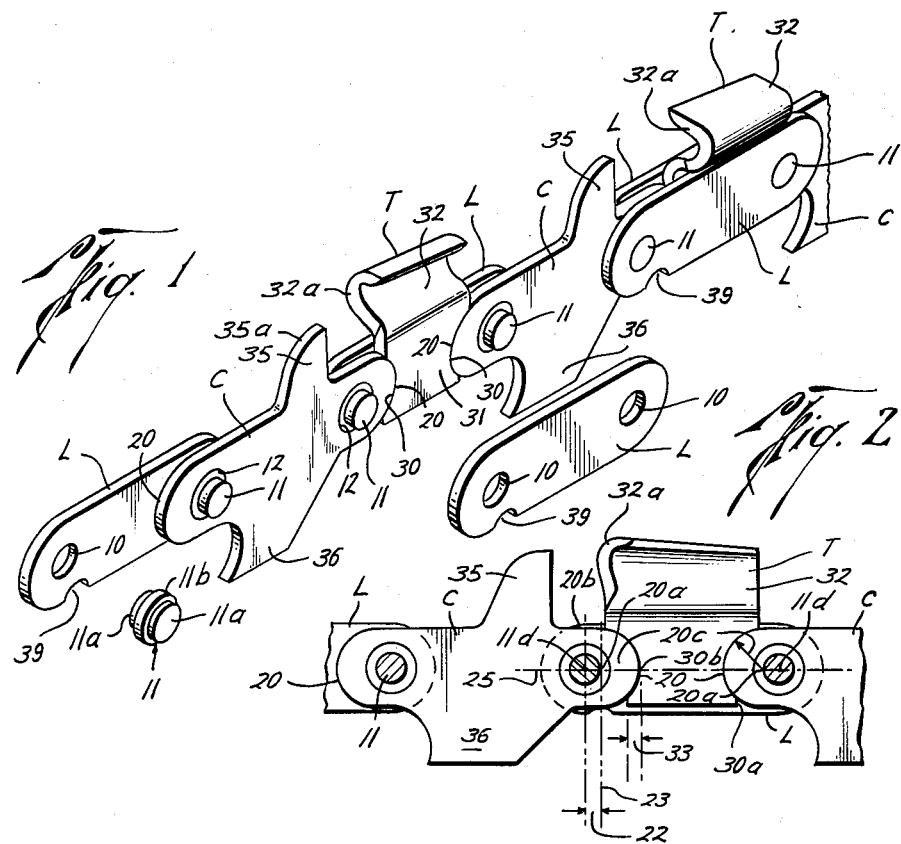
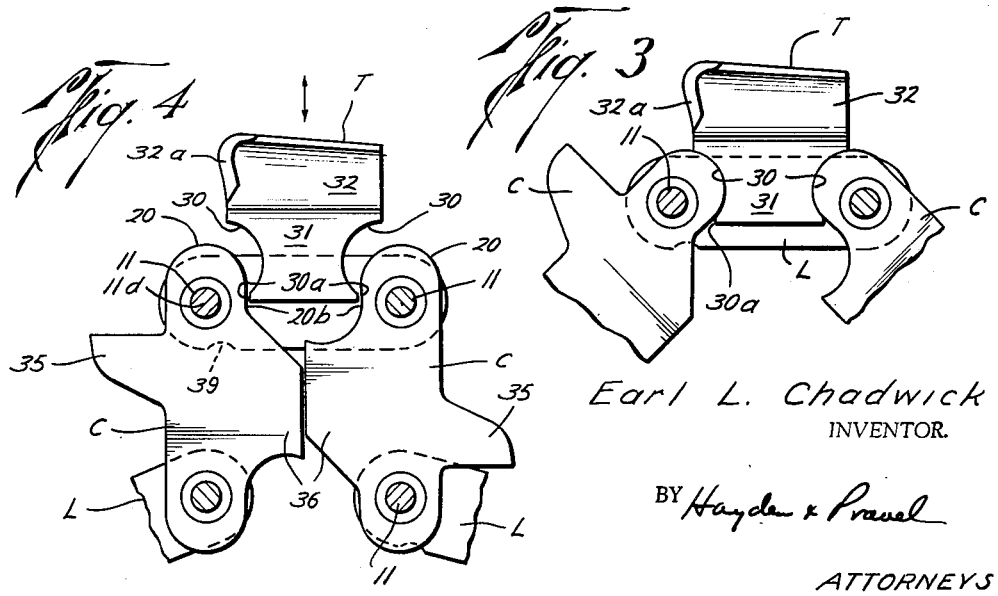
Earl L. Chadwick
INVENTOR.
BY Hayden & Pravel
ATTORNEYS Dec. 21, 1965  E. L. CHADWICK  3,224,476
SAW CHAIN
Filed Sept. 5, 1963  3 Sheets-Sheet 2
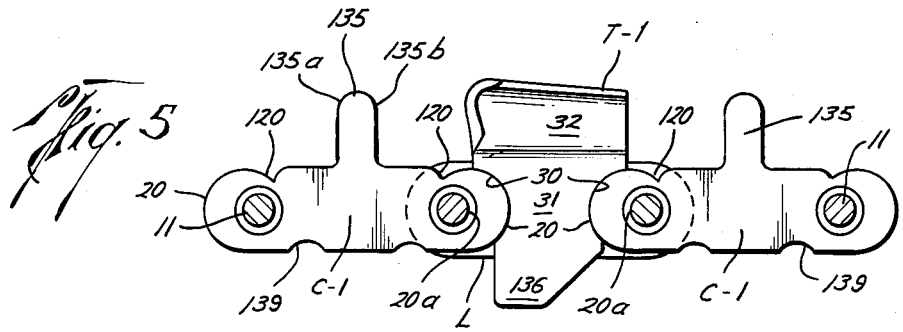
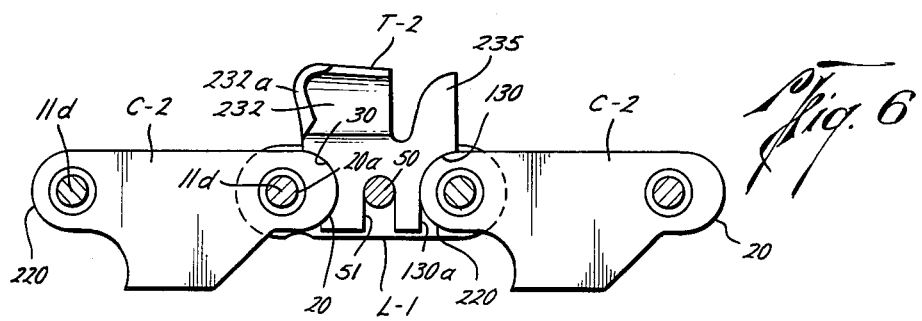
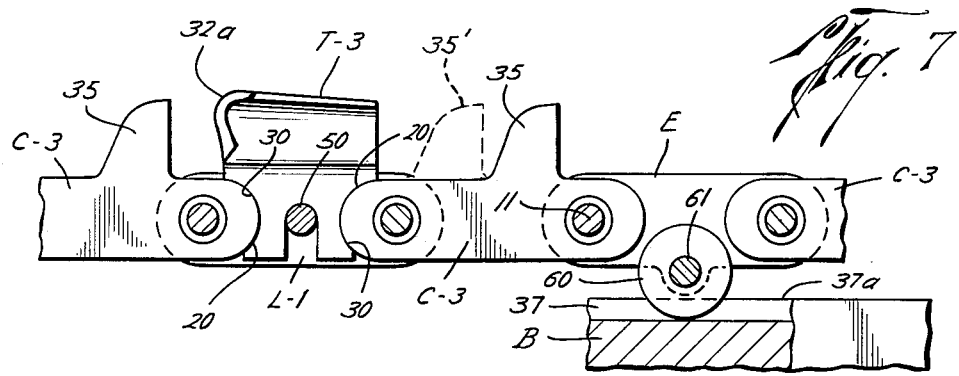
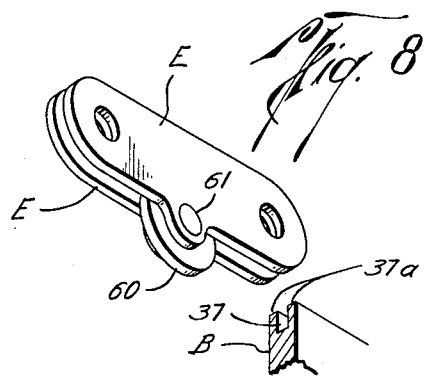
Earl L. Chadwick
INVENTOR.
BY Hayden & Pravel
ATTORNEYS Dec. 21, 1965  E. L. CHADWICK  3,224,476
SAW CHAIN
Filed Sept. 5, 1963  3 Sheets-Sheet 3
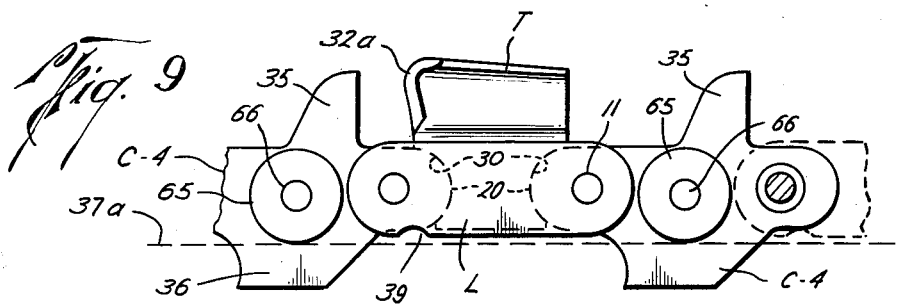
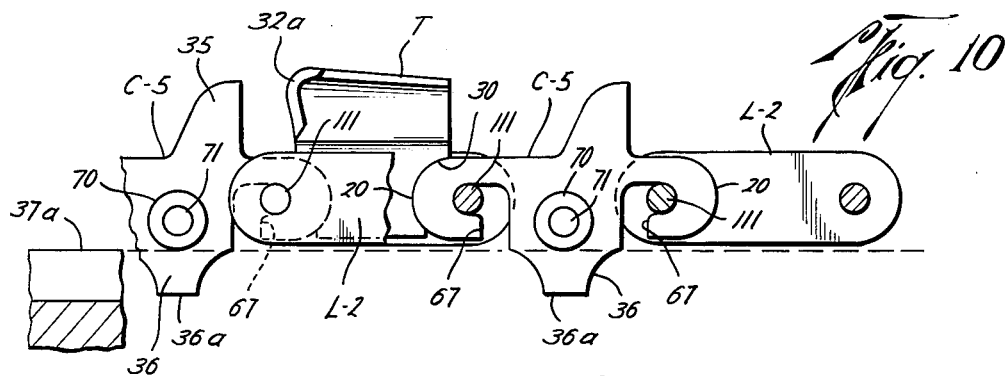
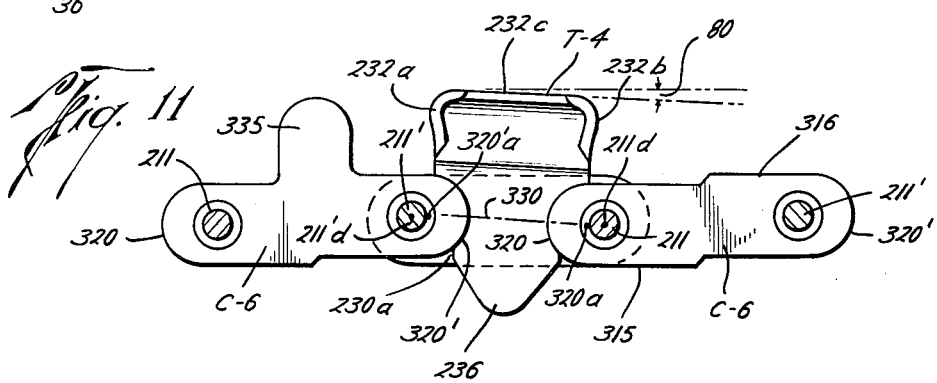
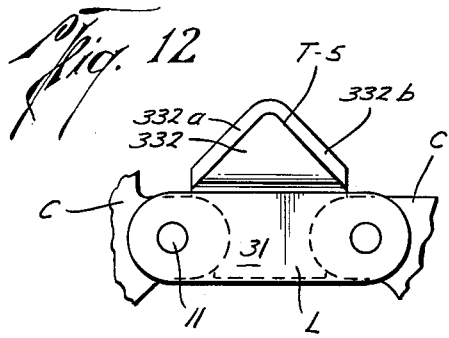
Earl L. Chadwick
INVENTOR.
BY Hayden & Pravel
ATTORNEYS

United States Patent Office 3,224,476
Patented Dec. 21, 1965

3,224,476
SAW CHAIN
Earl L. Chadwick, Portland, Oreg., assignor of three and three-quarters percent to Donald A. Schafer, Vancouver, Wash., and one and one-quarter percent to Waldo E. Caulfield, Portland, Oreg.
Filed Sept. 5, 1963, Ser. No. 306,822
6 Claims. (Cl. 143—135)

The present invention relates to saw chains and cutter teeth therefor.

In the past, the cutter teeth for saw chains have been secured by rivets or similar fastening means. Such prior constructions have made it difficult, and in most cases impossible, for the ordinary user to replace or even repair the cutter teeth.

It is therefore one object of the present invention to provide a new and improved saw chain having replaceable cutting teeth which are held in place in use without requiring any rivets or similar fastening means.

Another object of the present invention is to provide a new and improved saw chain and saw teeth therefor wherein holding links forming part of the chain lock and release the saw teeth carried therewith.

A particular object of the present invention is to provide a new and improved flexible saw chain having holding links for locking saw teeth in the chain wherein the holding links release the saw teeth by flexing the chain a predetermined amount.

A further object of the present invention is to provide a new and improved saw chain having cams formed integrally with its links for locking and releasing replaceable cutting teeth therewith.

Still another object of the present invention is to provide a new and improved flexible saw chain having cams formed integrally with its links for locking and releasing replaceable cutter teeth upon flexing of the cammed links into a predetermined position.

Still a further object of the present invention is to provide a new and improved replaceable tooth saw chain having reversible cutting teeth for cutting in opposite directions.

Another object of the present invention is to provide a new and improved replaceable tooth saw chain having reversible teeth with dual cutting surfaces facing in opposite directions.

A specific object of the present invention is to provide a new and improved saw chain having cam links with offset cams connected on opposite sides of each tooth supporting link so that a reversible cutter tooth may be releasably locked in each supporting link by the cams at a desired cutting angle whichever of the cutting edges of the cutter tooth is directed for cutting action in use.

A further object of the present invention is to provide a new and improved endless saw chain having cams formed on the ends of the links for locking and releasing a replaceable tooth between alternate links upon rotation of the cams about the pins connecting the links together.

Another object of the present invention is to provide a new and improved endless saw chain having cams formed on the ends of links adjacent each tooth carrying link for locking and releasing a replaceable cutting tooth upon a predetermined turning of the cam links.

Yet another object of the present invention is to provide a new and improved flexible saw chain having rollers thereon for rolling contact in the guide groove of a saw bar for supporting the chain on the saw guide as the chain moves with respect to the guide.

A further object of the present invention is to provide a new and improved saw chain having rollers mounted on the sides of the chain for engaging the sides of a saw bar to guide the chain along the saw bar with a minimum of friction.

Another object of the present invention is to provide a new and improved saw chain having roller guides for guiding a saw chain on a saw bar and supporting the chain links out of contact with the saw bar.

And yet another object of the present invention is to provide a new and improved saw chain comprised of a plurality of interlocking chain links and cutting links which may be shipped as separate parts and then releasably connected together by the user or other person to form a saw chain.

Another object of the present invention is to provide a new and improved reversible saw chain which is adapted to be used for cutting action in either direction of movement.

And still another object of the present invention is to provide a new and improved element of a saw chain which is a combination cutter tooth and saw bar guide, wherein said guide extends into a guide channel of a saw bar for guiding the chain as it is moved for sawing.

A further object of the present invention is to provide a new and improved saw chain having cutter teeth adapted to be held in the saw chain during use without rivets, and wherein a single cam-link is used for locking each cutter tooth in the chain.

The preferred embodiment of this invention will be described hereinafter, together with other features thereof, and additional objects will become evident from such description.

The invention will be more readily understood from a reading of the following specification and by reference to the accompanying drawings forming a part thereof, wherein an example of the invention is shown, and wherein:

FIG. 1 is an isometric view, partly exploded, illustrating one form of the saw chain of this invention;

FIG. 2 is a view illustrating in particular the details of the cam-link construction for holding or locking each cutter tooth in the saw chain;

FIG. 3 is a view similar to FIG. 2, but illustrating the parts thereof in an intermediate position during the release of the cutter tooth from the holding or cam links;

FIG. 4 is a view similar to FIGS. 2 and 3, but illustrating the release position of the holding or cam links to permit the release and removal of the cutter tooth;

FIG. 5 is an elevation, partly in section, illustrating another embodiment of the saw chain which is particularly suitable for travel in either direction during use, and also another embodiment of the cutter tooth having in combination the cutting edge and the guide projection;

FIG. 6 is an elevation, partly in section, illustrating another modification of the present invention wherein the cutter tooth is locked with only a single cam link, and the cutter tooth is modified to incorporate therewith the depth gauge;

FIG. 7 is an elevation, partly in section, illustrating a further embodiment of the present invention wherein the saw chain has incorporated therewith rollers which are adapted to fit into the groove of a saw bar for guiding and supporting the saw chain during its endless travel;

FIG. 8 is an isometric view illustrating one pair of links with the roller construction of FIG. 7 as used in conjunction with the saw bar;

FIG. 9 is a further modification, partly in elevation and partly in section, wherein roller guides are provided for engagement with the sides of the saw bar during the travel of the saw chain in use;

FIG. 10 is an elevation, partly in section, illustrating still another embodiment of the present invention wherein separate parts are adapted to be assembled in the field without the use of rivet connections;

FIG. 11 is a view partly in elevation and partly in section illustrating an offset cam link construction which permits the use of a reversible cutter tooth so as to dispose such cutter tooth at an angle of inclination with respect to the longitudinal travel of the saw chain regardless of the particular cutting edge which is disposed in the leading position; and FIG. 12 is an elevation showing a fragment of the saw chain of the invention with a modified cutter tooth having reversible cutting edges so that either or both of such cutting edges may be used for cutting wood and the like in the normal use of the saw chain.

Briefly, the present invention relates to a saw chain which includes a plurality of cam links or holding links C which are alternately disposed with respect to connecting links or straps L to form an endless loop. With the present invention, cutter teeth T are releasably held or locked to the chain during use without requiring rivets to hold such cutter teeth in position. Further, the construction of the present invention permits the release of the cutter teeth T from the links C and L when it is desired to replace, repair or reverse any of such cutter teeth T, as will be more fully explained hereinafter.

Considering the invention more in detail, and particularly the form illustrated in FIGS. 1–4 the links L and C together form the endless loop or chain. Preferably, the links L are disposed in pairs with a longitudinally extending space therebetween for receiving the ends of the adjacent cam links C. The links L are thus outside of the links C, with the outer ends of the links L overlapping the adjacent ends of the cam links C. Each of the connecting links or straps L has rivet openings 10 disposed therein for receiving the smaller diameter portions 11a of a rivet 11. Each rivet 11 also has a central large diameter portion 11b which is adapted to be received in an opening 12 at each end of the cam links C. When the connecting links or straps L are thus pivotally connected to two adjacent cam links C, the ends of the cam links are disposed centrally with respect to the two straps or connecting links L forming the pair.

In the form of the invention illustrated in FIG. 1 each of the cam links C has a cam surface or holding surface 20 formed at each end thereof. Each of such cam surfaces 20 is eccentrically formed with respect to the pivot center 11d (FIG. 2) of the pivot pin 11 making the connection between the links L and C. Thus, the cam surface 20 is formed with a true radius, but the center point 20a (FIG. 2) of such radius is laterally offset by the distance indicated at 22 so as to form such eccentric relationship with the pivot center 11d. Such true radius from the center point 20a continues to approximately the intersection of the line 23 with the cam surface 20, at which point the distance from the longitudinal axis 25 passing through the pivot point 11d is uniform so that the portion 20a of the surface 20 which continues to the left of the line 23 as viewed in FIG. 2 is spaced from the longitudinal axis 25 a distance which equals the radius of the cam surface 20. Thus, the distance from the longitudinal center line 25 of each cam link 20 to the substantially straight surfaces 20b is equal to the radius indicated at 20c from the center point 20a to the cam surface 20. For example, if the radius 20c is one-eighth of an inch, the distance from the center line 25 to each of the surfaces 20b is likewise one-eighth of an inch. The offset distance 22 from the center point 20a to the center pivot point 11d may, by way of example, be one-sixteenth of an inch. It will of course be appreciated that such dimensions may be varied by those skilled in the art within the scope of this invention.

In the form of the invention illustrated in FIG. 1, each of the teeth T is formed with a cam recess or holding recess 30 which has an internal recess radius which is the same as, or substantially the same as, the radius 20c. When the cutter tooth T is held or locked in position for use as shown in FIG. 2 by the two adjacent cam links C, the surface 30 conforms generally to the surface 20. The lower side edge 30a at the bottom of each cutter tooth T is disposed in a relationship to the point at which the center line 25 passes through the radius 30 which is indicated at 30b. Such relationship is indicated by the space 33 which extends from the lower side edge 30a to the point 30b. Such space 33 must be no greater than the space 22 in order to accomplish a release of the cutter tooth T upon a pivoting action of the cam links C to that shown in FIG. 4, as will be more fully explained. Thus, considering the example heretofore given with respect to the radii employed with the cam link C, it will be evident that the cam recess surface 30 on each side of the tooth T would have a radius of one-eighth of an inch which would correspond to the radius 20c, and the space 33 would be one-sixteenth of an inch or less to correspond with the space 22. Again, other dimensions may be employed by those skilled in the art within the scope of this invention.

The cutter tooth T illustrated in FIG. 1 actually has the cam recesses 30 formed in its shank 31 which is the portion disposed between the ends of the cam links C and between the connecting straps or links L. The upper portion of each cam tooth T is provided with a conventional hook shaped section 32 which has a cutting edge 32a on the leading edge which is used in sawing or cutting the wood or the like. For the most effective cutting action, it is preferable to provide the cutter teeth with opposite angular portions 32 as seen by the alternate cutter teeth T in FIG. 1, each of which still has the leading edge formed with the cutting surface 32a of conventional shape. As will be more evident hereinafter, the same basic invention as described in connection with the cam lock construction of FIGS. 1 and 2 may be employed with various other types of cutter teeth than illustrated in FIG. 1.

FIG. 1 also illustrates a form of cam link C which has a depth gauge or rake 35 formed therewith having a curved rake surface 35a. The height of the rake 35 actually is related to the height of the cutter portion 32 of each cutter tooth T so as to limit the depth of the cut with the saw teeth T, as is well known in the art. Each of the cam links C is preferably provided with a stabilizer guide or drive extension 36 which is of conventional construction and which is adapted to fit in the conventional groove of a saw bar for guiding the chain in the endless movement during use. The saw bar is conventional, and therefore only a portion of such saw bar B has been illustrated in FIGS. 7 and 8. The saw bar B is provided with a central groove 37 and upper external surfaces 37a. In the usual case, the stabilizer guide or drive extensions 36 extend into the groove 37 of any conventional saw bar B to guide the endless chain as it travels in its endless path. Also, the guide extensions 36 serve as drive members at the end of the saw bar in the conventional manner by engagement with a drive gear, one type of which is shown in the United States Patent No. 2,852,048 issued to J. B. Cox. Further, to facilitate the feeding of the saw chain in its endless travel, each of the straps or links L is provided with a recess 39 which is adapted to be engaged by the ends of the drive gear teeth in the known manner.

Considering now the manner of locking and releasing each cutter tooth T in the saw chain, reference is made in particular to FIGS. 2–4. In FIG. 2, a cutter tooth T is illustrated in the locked position during the normal use of the saw chain. The direction of movement of the saw chain is from the right to the left as viewed in FIG. 2 so that the cutting edge 32a of the cutter tooth T is adapted to cut or saw into the wood or other material. By reason of the construction of the cam surfaces 20 and the cam recess surfaces 30, as previously described, the tooth T is locked in position between the adjacent ends of the cam links C. The pair of links L, one of which is shown in FIG. 2, serves to prevent lateral displacement of the tooth T from the space between such connecting links L. Thus, in effect, the tooth T is confined in a slot which is defined by the pair of straps L and the cam surfaces 20 on the adjacent cam links C.

When it is desired to release a cutter tooth T, the chain is made slack in the usual manner so that the chain links may be flexed as illustrated in FIGS. 3 and 4. The cam links C adjacent the cutter tooth T to be released are then pivoted downwardly about the pivot pins 11 to the intermediate position of FIG. 3 which causes an initial movement of the cutter tooth T upwardly and away from the links C and L, but it is to be noted that the cutter tooth T is still actually retained or held in a connected position. This intermediate positon of FIG. 3 thus illustrates that even though there is some flexing of the parts of the flexible saw chain during the travel of the chain around the ends or curved portions of the saw bar, there is still no inadvertent release of the cutter teeth T in use.

When the cam links C are pivoted to the position shown in FIG. 4, wherein they are substantially perpendicular to the longitudinal line of travel of the saw chain in use, the cutter tooth T may then be readily released and removed from the chain.

It is to be noted that when the parts reach the position shown in FIG. 4, the lower side edges 30a are each a distance from the center pivot points 11d which is the same as, or slightly less than the radius 20c. Therefore, the ends of 30a readily clear the edges 20b of the cam surfaces 20 as the tooth T is pulled substantially vertically out from the space between the cam links C.

For reinserting the tooth T or a replacement thereof into the space between the cam links C, the cam links C are again moved to the position shown in FIG. 4, the tooth T is inserted downwardly to the position of FIG. 4 or slightly below, and then the cam links C are pivoted to the intermediate position of FIG. 3 and ultimately to the operating position of FIG. 2, to thereby lock the cutter tooth T in position for use. It is to be noted that with the cam construction of this invention, as explained above in connection with FIGS. 1–4, and as will be explained hereinafter in connection with the other figures, no rivets are required to hold the cutter tooth T in the locked position during use. This is a particular advantage since it enables a user in the field to remove teeth, replace or repair them, without the need of any special tools or parts. It also makes it possible to change the particular type of cutter tooth T, which is employed for different conditions of use and the different materials being cut.

In FIG. 5, a modification is illustrated wherein the folding links or cam links C–1 are modified as compared to the cam links C, and the cutter tooth T–1 is modified as compared to the cutter teeth T of FIG. 1. The connecting lengths or straps L are identical to those illustrated in FIGS. 1–4. The tooth T–1 has the same parts as illustrated in FIG. 1 and therefore has the same numeral and letter designations, with the cam surfaces 30 being engaged by the cam surfaces 20 of the cam links C–1 in the same manner as described in connection with FIGS. 1–4. Additionally, the tooth T–1 has a lower extension 136 which serves as a stabilizer guide and drive element basically in the same manner as heretofore described in connection with the guide and drive element 36 of FIG. 1. Thus, in FIG. 5 the stabilizer guide and drive element 136 is used in place of the elements 36 of FIG. 1, although it is possible to use both of such elements together.

The cam links C–1 omit the guides 36 of FIG. 1 and they provide a modified rake or depth gauge 135 which has a curved surface 135a on the left hand side as viewed in FIG. 5 and also a corresponding curved surface 135b on the right hand side as viewed in FIG. 5. Thus, with the construction of FIG. 5, the chain may be moved in either the forward or rearward direction, or to the left or to the right as viewed in FIG. 5, since the depth gauges 135 may be used in either direction. The tooth T–1 of course must be reversed in the event the chain is moved to the right as viewed in FIG. 5 rather than to the left. It is also to be noted that the upper or outer edge of the surface 20 is continued to form a notch 120 which facilitates the movement of the saw chain around the bend or curvature of the saw bar during use. Such notch 120 results from the curvature or radius for the surface 20 being extended on to a further extent than in the form of the invention illustrated in FIGS. 1–4. Such curvature is from the radius center point 20a so that the surface 20 continues on around to form the notch 120. Also, the recesses for the drive gear are provided at 139 in the cam links C–1 rather than at 39 as previously described for the links L in FIGS. 1–4. It is to be noted that as the chain illustrated in FIG. 5 moves to the left and passes around the bend or curvature of the saw bar, the notch 120 on the cam link C–1 on the right is utilized to facilitate such angular movement, whereas when the chain in FIG. 5 moves to the right, the notch 120 on the cam link C–1 on the left serves to facilitate the movement around the end or curvature of the saw bar.

FIG. 6 illustrates a further modification wherein the lengths L–1 correspond with the links L, but are modified to provide an intermediate holding or retaining pin 50 extending between each pair of the links L–1. Also, there is only a single cam surface 30 on the tooth T–2 so that there is only a single cam employed to hold the tooth T–2 in position. The tooth T–2 has a recess or notch 51 which is adapted to fit over the retaining pin 50 when the tooth T–2 is held between the adjacent cam lengths C–2. The surface 130 of the tooth T–2 has its upper portion with a radius of curvature corresponding to the radius of curvature 220, but it is to be noted that such surface 130 becomes substantially straight or vertical as indicated at 130a (FIG. 6) so that there is actually no cam action by the surface 220 with the surface 130. The cam link C–2 on the left as shown in FIG. 2 has its cam surface 20 which is identical to that described in connection with FIG. 1, but the other end of such cam link C–2 has a surface 220 which has the same radius, but the radius is coincident with the center pivot point 11d rather than being offset to the point 20a. Thus, each of the cam links C–2 has a cam surface 20 on one end and a curved non-cam surface 220 on the other end. In this manner, each of the teeth T–2 which is incorporated in the complete saw chain is actually engaged by only a single cam lock construction. It should also be noted that the pin 50 may be omitted if desired, and the notch 51 would also then be omitted from the tooth T–2.

In FIG. 6, the tooth T–2 is shown as modified as compared to the tooth T–1 in that the tooth T–2 has the depth gauge 235 incorporated therewith and in a position rearwardly of the cutting edge 232a. The depth gauge or rake 235 may be positioned forwardly of the cutting edge 232a if desired, rather than in the position shown in FIG. 6, in which case the cutter body 232 would be to the right and the depth gauge or rake 235 would be to the left on the integral portion of the tooth T–2.

In FIG. 7 another form of the invention is illustrated, wherein the cam links C–3 are basically the same as the cam links C of FIG. 1 except that the guide extensions or drive elements 36 are omitted. The links L–1 correspond with the links L–1 of FIG. 6, and preferably include the retaining pin 50 for receiving the notch 51 on the tooth T–3. The tooth T–3 is formed with cam surfaces 30 on both sides to have a double cam lock with the cam surfaces 20 on the cam links C–3. In FIG. 7, an extra link E which is normally formed in pairs as shown in FIG. 8, is included in the saw chain for supporting a roller 60 on a roller shaft 61. Such pair of links E are connected to the adjacent cam links C–3 by pivot pins 11 or any other suitable connecting pivots. The roller 60 is adapted to extend into the groove or channel 37 of the saw bar B for supporting and guiding the saw chain with a minimum of friction as the saw chain is moved in its endless travel relative to the saw bar B.

Although the wheel or roller 60 is shown as positioned on the extra links E, it will be appreciated that such rollers 60 may be employed on either the cam links C–3 or on the connecting links or straps L–1, in which case the extra links E may be omitted.

Also, a second raker tooth 35' is indicated in dotted lines in FIG. 7 to illustrate that dual raker teeth may be employed. Preferably, such dual raker teeth 35 and 35' (FIG. 7) are laterally offset for more effective raking action.

In FIG. 9, the cutter tooth T, the links L, and the cam links C–4 are identical with the corresponding parts of the saw chain illustrated in FIG. 1, but each of the cam links C–4 has a guide roller 65 rotatably mounted on a shaft 66 for engagement with the upper edge 37a of the saw bar guide B (shown in dotted lines in FIG. 9 and solid lines in FIGS. 7 and 8). It is noted that the rollers 65 are mounted so that the lower edges of the links L are spaced slightly above the surfaces 37a when the rollers 65 are in engagement with such surfaces 37a. It will be understood of course that any of the features referred to heretofore in connection with FIGS. 5–8 may also be incorporated in the structure of FIG. 9 in addition to the rollers 65.

In the form of the invention shown in FIG. 10, the saw chain is made up of a plurality of separate interlocking links which may be shipped as separate parts and connected together in the field by the user or any other person. Such assembly does not require any tools or special equipment or parts other than those forming the saw chain itself. Thus, the links L–2 interlock or connect together the alternate links C–5 which are basically the cam or holding links of the general type illustrated in FIG. 1, except for the connecting means for pivotally assembling the links C–5 to the links L–2. In FIG. 10, the links L–2 are connected by pivot pins 111 which rigidly hold each pair of links L–2 spaced and connected as a unitary pair. The links C–5 are each provided with a plurality of L-shaped recesses or grooves 67 which permit the links C–5 to be dropped into position between two pairs of links L–2 and interlock with the pivot pins 111.

The ends 20 of each of the cam links C–5 are identical with the ends 20 of the links C and provide for the cam or holding surface which coacts with the holding surfaces 30 on the cutter tooth T so as to hold the cutter tooth T in the same manner as heretofore described in connection with FIGS. 1–4.

In some instances, in order to reduce the friction during the travel of the endless saw chain with respect to the saw bar B, it may be desirable to provide anti-friction rollers 70 on each of the cam links D–5, each of which is mounted on a rotatable shaft 71. The rollers 70 engage the upper or outer edge 37a of the saw bar B as indicated in dotted lines in FIG. 10. When the rollers 70 are employed, the bottom or inner edges 36a of the drive extensions 36 ride just above or away from the bottom of the groove 37, and the lower edges of the links L–2 also ride above the edges 37a so that the chain is supported on the rollers 70 with a minimum of friction during the travel thereof. Such rollers 70 may of course be employed in other forms of the saw chains heretofore or hereafter described. It is to be noted that the principal difference between the rollers 65 and 70 resides in the size or diameter thereof, it being understood that diameters of the rollers may vary for different conditions and different sizes of saw chains.

In FIG. 11, a reversible cutter tooth T–4 is shown having cutting edges 232a and 232b on each side thereof so that either side of the tooth may be faced in the direction of movement of the chain. The upper edge 232c is parallel to a line such as 330 passing through the centers of the cam recesses 30 so that the tooth T–4 when free from the chain has no cutting angle for either edge 232a or 232b. However, such tooth T–4 is locked in place by holding links or cam links C–6 between a pair of connecting links or straps L in such a manner that the tooth T–4 is inclined at a selected angle such as indicated at 80 in FIG. 11. Such angle 80 places the leading cutting edge 232a above the portion of the tooth T–4 which follows so that the angle of inclination is basically the same as in the tooth T in FIGS. 1–4 even though the tooth T–4 itself has no angle. By reversing the tooth T–4, the opposite cutting edge 232 is put in the position of the leading edge and will assume the same angle 80 as illustrated in FIG. 11 due to the construction of the cam links C–6.

Such cam links C–6 are mounted in basically the same manner as the links C of FIG. 1, but the leading pivot pins 211 are offset below or inwardly from the trailing pivot pins 211'. The cam surface 320 is formed on a radius from a center point 320a which is on the same longitudinal line as the pivot center point 211d on each of the left hand end portions of the cam lengths C–6. On each of the right hand ends of the cam lengths C–6, the cam surface 320' is on a radius from a center point 320'a which is on the same longitudinal line as the pivot center point 211'd. The angle of inclination of the pins 211 and 211' on the connecting straps L is indicated by the line 330.

The cutter tooth T–4 has cam recesses 30 which are in alignment with each other so that when the surfaces 30 are positioned in the offset cam surfaces 320 and 320' as illustrated in FIG. 11, the angle of inclination indicated at 80 is obtained for the tooth T–4. A further variation of the cutter tooth T–4 is illustrated by the guide extension or stabilizer 236 which is adapted to extend into the guide groove 37 of a saw bar B and which extends downwardly from the lower edges 230a which correspond with the lower edges 30a as illustrated in FIGS. 2–4. Thus, the tooth T–4 may be readily inserted and removed from the saw chain for replacement or repair as previously described in connection with FIGS. 1–4. Also, each of the cam lengths C–6 preferably has a depth gauge or rake 335 for removing chips and the like, but only one of each sequency of links C–6 may have such rake 335 as indicated in FIG. 11. In fact, all of the links C–6 may have the rake 335 omitted, in which case the chain may be turned over to use the upper edge 316 as the wear surface for contact with the saw bar surface 37a after the lower edge 315 has become worn or unusable. The rake and bar guide will be incorporated with the tooth T–4 or with alternate teeth.

FIG. 12 is a reversible cutter tooth construction wherein a cutter tooth T–5 is illustrated in conjunction with cam lengths C and connecting lengths L. The cutter tooth T–5 is provided with a shank 31 which is identical with the shank 31 of the tooth T of FIG. 1 and has cam recesses 30 for cam locking engagement with the cam surfaces 20 of the cam lengths C. However, the upper portion of the cutter tooth T–5 is modified as compared to the tooth T, and it includes an upper tooth section 332 which has cutting edges 332a and 332b. When the chain is moving to the left as viewed in FIG. 12, the cutting edge 332 of the tooth T–5 serves to cut or saw the wood or other material. On the other hand, if the saw chain is moving to the right as viewed in FIG. 12, the cutting edge 332b is utilized for the cutting action. Thus, the direction of movement of the saw chain may be reversed while still employing the same cutter teeth T–5. If the direction of movement of the saw chain remains the same, then the leading edge 332a is used until it becomes dull or unusable, and at that time it is ejected as shown in FIG. 4. Thereafter, the tooth T–5 is reversed to place the cutting edge 332b as the leading edge, and such tooth T–5 is reinserted and locked in the position for subsequent use. Various other shapes and configurations of the cutting edges 332a and 332b may be employed so long as they are effective in cutting the wood as the saw chain is moved with the cutter teeth T–5 in contact with the wood or other material to be cut.

It will be understood that the tooth T–5 may be employed with the other various embodiments of the cam links and connecting links illustrated in the other figures of the drawings. Also, it will be evident to those skilled in the art that the cam links, connecting straps, and cutter teeth may be variously interchanged with the several forms of the invention illustrated in the drawings. Also, the rollers used as guides may be used with the various embodiments illustrated.

The foregoing disclosure and description of the invention is illustrative and explanatory thereof, and various changes in the size, shape and materials as well as in the details of the illustrated construction may be made within the scope of the appended claims without departing from the spirit of the invention.

What is claimed is:

1. A saw chain for cutting wood and the like, comprising:
   (a) a plurality of holding links and connecting links adapted to be disposed in an endless loop,
   (b) pivotal connection means pivotally connecting a pair of said holding links to a pair of said connecting links,
   (c) said pair of holding links having opposing ends which are longitudinally spaced from each other to provide a cutter tooth slot between said pair of said connecting links,
   (d) a cutter tooth having a shank positioned in said cutter tooth slot,
   (e) co-acting means entirely externally of said cutter tooth including co-acting holding surfaces on the shank of said cutter tooth and said opposing ends of said pair of holding links for releasably holding said cutter tooth so as to eliminate the need for shear pins and the like for holding the cutter tooth on the chain,
   (f) the holding surface on each of said opposing ends of said pair of holding links being formed on a radius which is offset from the point of pivoting of said pivotal connection means in a direction longitudinally towards the cutter tooth shank and along an axis passing substantially through the pivot points of the pivotal connection means for the pair of holding links,
   (g) each of said opposing ends of said pair of holding links having a lower edge surface merging with said holding surface but at a lesser distance from the pivot point than the radius of said holding surface,
   (h) the holding surface on the shank of the cutter tooth having a radius substantially the same as the radius of the holding surface on the adjacent holding link, and
   (i) the lower portion of the holding surface on the cutter tooth shank extending beyond the inner extremity of the holding surface on the adjacent holding link a distance which is approximately equal to the distance of said lower edge from the pivot point of the adjacent holding link to prevent a release of said shank until said pair of holding links has pivoted approximately ninety degrees from the holding position.

2. A subcombination of a saw chain for cutting wood and the like, comprising:
   (a) a plurality of holding links and connecting links disposed in an endless loop,
   (b) pivotal connection means pivotally connecting a pair of said holding links to a pair of said connecting links,
   (c) said pair of holding links having opposing ends which are longitudinally spaced from each other to provide a cutter tooth slot between said pair of said connecting links,
   (d) holding surfaces on the opposing ends of said pair of holding links for releasably holding a cutter tooth without a shear pin,
   (e) each holding surface being formed on a radius which is offset from the point of pivoting of the pivotal connection means for one of said holding links in a direction towards the pivotal connection means on the other of said holding links and along an axis passing substantially through the pivot points of the pivotal connection means for the pair of holding links, and
   (f) each of said pair of holding links having a lower edge surface merging with its holding surface but at a lesser distance from the pivot point than the radius of said holding surface.

3. The structure set forth in claim 1, including:
   (a) a retaining pin mounted on said connecting links and extending into the cutter tooth slot, and
   (b) said cutter tooth having a recess in said shank thereof for receiving said retaining pin when the cutter tooth is disposed in the cutter tooth slot.

4. The structure set forth in claim 1, including:
   (a) a plurality of roller links disposed at selected positions in the endless chain loop, and
   (b) a guide roller on the lower edge of each of said roller links to minimize friction as the saw chain is moved in its endless path.

5. The structure set forth in claim 1, wherein the axis passing substantially through the pivot points of said pivotal connection means for the pair of holding links is at an angle with respect to the longitudinal axis of the saw chain, and wherein said cutter tooth has a cutting edge on the forward and rear ends so as to be reversible.

6. A saw chain for cutting wood and the like, comprising:
   (a) a plurality of holding links and connecting links adapted to be disposed in an endless loop,
   (b) pivotal connection means pivotally connecting a pair of said holding links to a pair of said connecting links,
   (c) said pair of holding links having opposing ends which are longitudinally spaced from each other to provide a cutter tooth slot between said pair of said connecting links,
   (d) a cutter tooth having a shank positioned in said cutter tooth slot,
   (e) coacting means entirely externally of said cutter tooth including coacting holding surfaces on the shank of said cutter tooth and said opposing ends of said pair of holding links for releasably holding said cutter tooth so as to eliminate the need for shear pins and the like for holding the cutter tooth on the chain, (f) the holding surface on one of said pair of holding links being formed on a radius which is offset from the point of pivoting of said pivotal connection means in a direction longitudinally towards the cutter tooth shank and along an axis passing substantially through the pivot points of the pivotal connection means for the pair of holding links, (g) said one of said pair of holding links having a lower edge surface merging with said holding surface but at a lesser distance from the pivot point than the radius of said holding surface, (h) the holding surface on the shank of the cutter tooth having a radius substantially the same as the radius of the holding surface on the adjacent holding link, and (i) the lower portion of the holding surface on the cutter tooth shank extending beyond the inner extremity of the holding surface on the adjacent holding link a distance which is approximately equal to the distance of said lower edge from the pivot point of the adjacent holding link to prevent a release of said shank until said one of said pair of holding links has pivoted approximately ninety degrees from the holding position.

References Cited by the Examiner

UNITED STATES PATENTS

| | | |
|---|---|---|
| 677,095 | 6/1901 | Nagel. |
| 1,998,188 | 4/1935 | Dunn _____ 279—77 |
| 2,749,950 | 6/1956 | Jamieson et al. _____ 145—135 |

WILLIAM W. DYER, Jr., *Primary Examiner.*

DONALD R. SCHRAN, *Examiner.*